United States Patent [19]

Day

[11] 4,300,927
[45] Nov. 17, 1981

[54] POCKET FILTER ARRANGEMENT

[75] Inventor: Charles E. Day, Jeffersonville, Ind.

[73] Assignee: American Air Filter Company, Inc., Louisville, Ky.

[21] Appl. No.: 202,568

[22] Filed: Oct. 31, 1980

[51] Int. Cl.³ .............................................. B01D 46/02
[52] U.S. Cl. ....................................... 55/378; 55/483; 55/521
[58] Field of Search .................. 55/483, 484, 500, 502, 55/507, 509, 378, 341 NT, 514, 521; 210/323 R

[56] References Cited

U.S. PATENT DOCUMENTS

| | | | |
|---|---|---|---|
| 2,945,554 | 7/1960 | Berly | 55/341 NT |
| 3,190,059 | 6/1965 | Bauder et al. | 55/491 |
| 3,422,602 | 1/1969 | Janson | 55/484 |
| 3,524,304 | 8/1970 | Wittemeier et al. | 55/483 |
| 3,616,625 | 11/1971 | Cotabish et al. | 55/483 |
| 3,815,754 | 6/1974 | Rosenberg | 55/514 |
| 3,871,848 | 3/1975 | Smith | 55/484 |

*Primary Examiner*—Bernard Nozick
*Attorney, Agent, or Firm*—Thomas G. Anderson

[57] ABSTRACT

A pocket filter cartridge including at least one sheath-like filter bag which is suspended from a mounting sleeve affixed to an apertured header plate disposed across a dirty gas stream by a retaining collar holding it in press-fit clamping relation to the mounting member.

8 Claims, 6 Drawing Figures

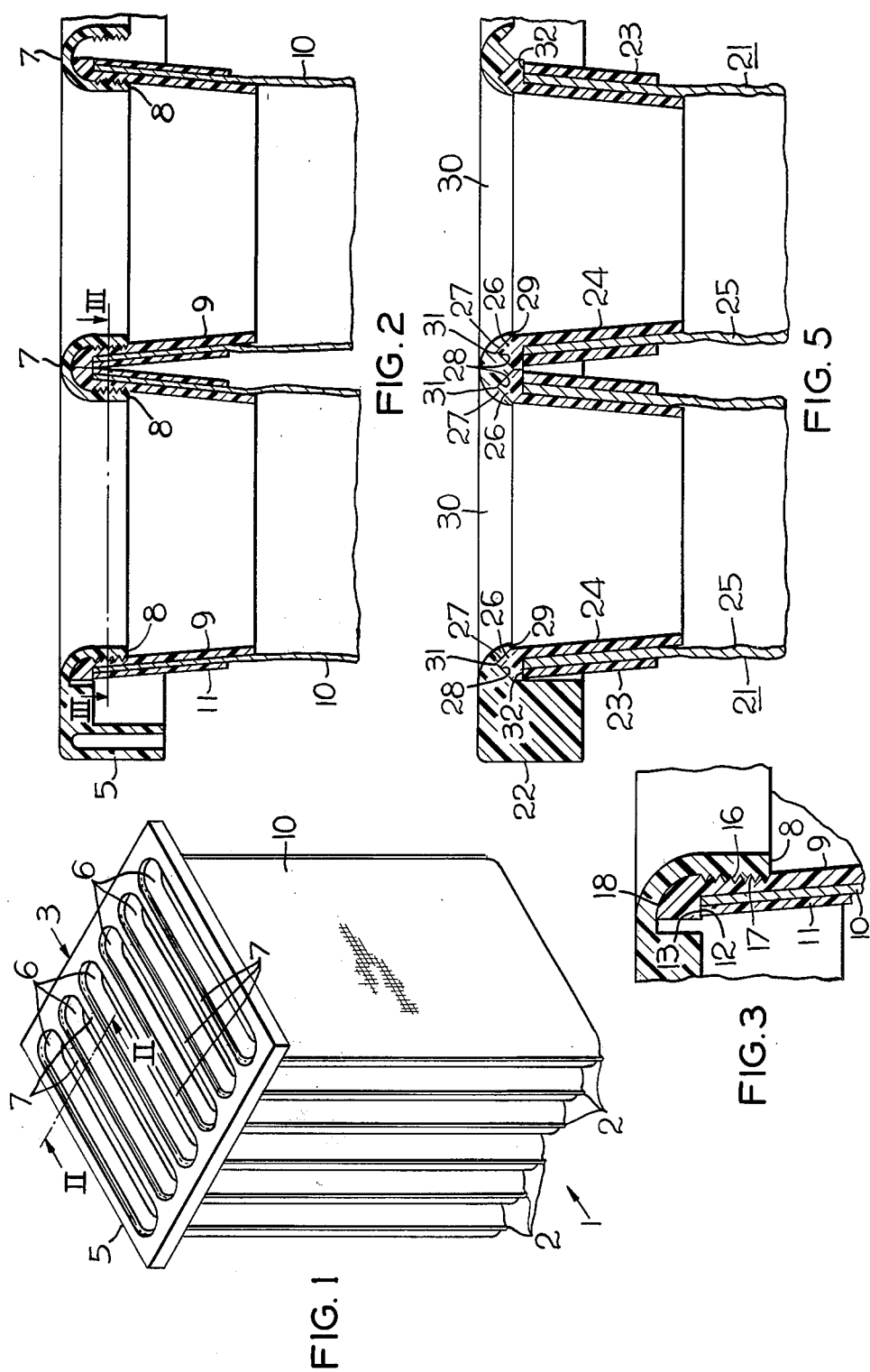

POCKET FILTER ARRANGEMENT

BACKGROUND OF THE INVENTION

1. Field of the Invention

The present invention relates to gas separation devices and in particular to a pocket filter arrangement for removing particulate solids from a dirty gas stream.

2. Description of the Prior Art

As exemplified by U.S. Pat. Nos. 3,190,059 and 3,871,848, the prior art discloses a variety of pocket filter arrangements. As shown in the foregoing patents, a pocket filter generally includes a plurality of relatively flat, sheath-like filter bags secured to a common mounting frame to form a filter cartridge having a series of filter pockets suspended from the frame in adjacent side-by-side relation. Typically, one or more of the cartridges are secured across the interior of a gas duct so that particulate materials are separated from the gas stream as it flows through the filter media from the interior of each of the filter pockets. When it becomes necessary to replace the filter media in the filter cartridge, the entire cartridge is removed and thrown away and a new cartridge is installed in its place. Thus, it is particularly desirable for the filter cartridge to be of a durable and lightweight construction which is easy to assemble and inexpensive to make.

SUMMARY OF THE INVENTION

The present invention relates to gas separation devices and in particular to a header and associated filter supporting structure in a pocket filter cartridge suitable for removing particulate solids from a dirty gas stream.

The filter cartridge includes a plurality of relatively flat, sheath-like filter bags suspended from an apertured header plate which is adapted to be secured across a dirty gas stream. Each filter bag is secured to a mounting member in the open end of the bag by a retaining collar which surrounds the filter and holds it in press-fit clamping relation to the mounting member. The mounting member and the filter bag are in turn secured to a projecting lip provided about a corresponding aperture in the header plate to align the filter in flow-through communication with the plate aperture.

It can be seen that the filter cartridge embodying the invention is of a relatively lightweight and durable design which is easy to fabricate and assemble. However, it is to be understood that various changes can be made in the arrangement, form and construction of the apparatus disclosed herein without departing from the scope and spirit of the invention.

DESCRIPTION OF THE DRAWINGS

FIG. 1 is an isometric view of the filter cartridge;

FIG. 2 is an enlarged partial cross-sectional view taken substantially along line II—II in FIG. 1;

FIG. 3 is a further enlarged cross-sectional view of the joint between the mounting member and the header plate as it is shown in FIG. 2;

FIG. 5 is a view similar to FIG. 2 showing an alternative embodiment; and

DESCRIPTION OF THE PREFERRED EMBODIMENT

Figure 4:
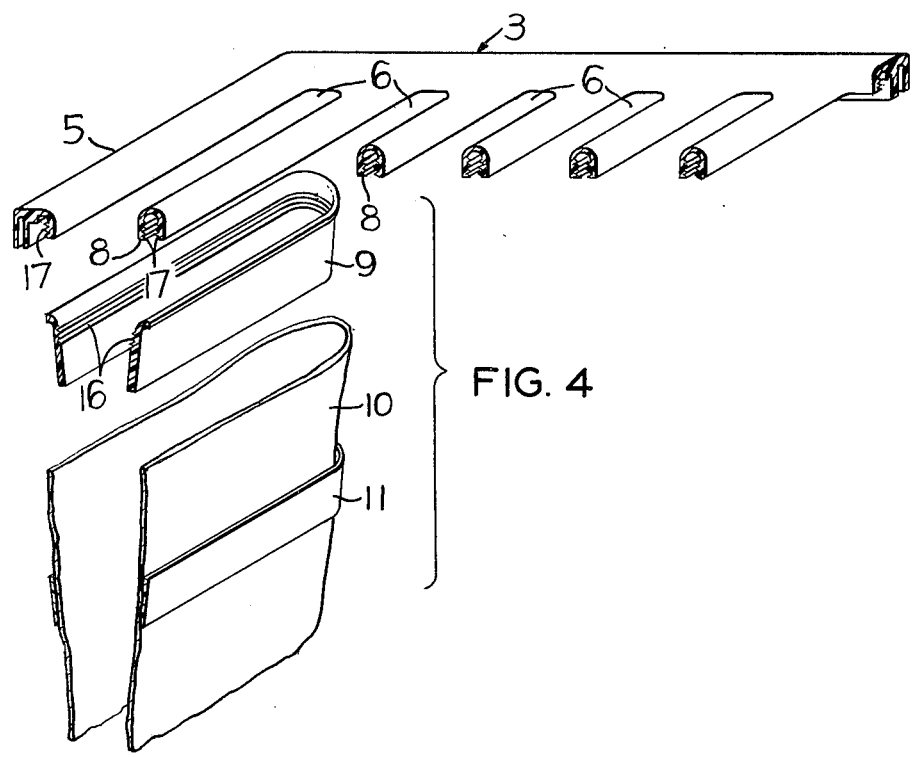
FIG. 4 is an exploded isometric view of one of the filter bags and the header plate.

As shown in FIG. 1, each of the filter cartridges 1 includes a plurality of relatively flat, sheath-like filter bag assemblies 2 secured to a generally rectangular plastic header plate 3 adapted to be removably secured across a dirty gas stream in a gas duct as is well known in the art. As shown in the drawings, the header plate 3 includes an outer rigidifying flange or border 5 and a plurality of elongated, parallel apertures 6 which are separated by spacing portions 7 extending across the plate, it being noted that a projecting peripheral lip 8 is formed in the plate about the periphery of each aperture for securing the filter assemblies to the plate as will be described.

Each of the filter assemblies 2 is secured in one of the apertures, 6 by a plastic mounting sleeve or member 9 affixed in the end of a sheath-like filter bag 10 by a plastic retaining collar or clamping ring 11. The retaining collar 11, which is preferably affixed to an upper shoulder 12 on the mounting member 9 by sonic spot welding as indicated at 13 in FIG. 3, is sized to be secured in a press-fit fashion about the end of the filter and the mounting members. In this arrangement, the outer surface of the mounting member 9 and the interior surface of the retaining collar 11 are provided with a relatively rough texture so that the end of the filter bag is effectively clamped between the mounting member and the retaining collar to support the bag while also providing a dust tight seal between the filter media and the mounting member.

During assembly of the filter cartridge, each of the filter assemblies 2 is initially secured to the header plate 3 by a press-fit, serrated compression joint between its respective mounting member 9 and the lip 8 of the header plate 3. As shown in FIG. 3, the upper interior periphery of the mounting member 9 is provided with a tapered serrate edge 16 which is adapted to grasp a corresponding serrate edge 17 disposed about the periphery of the lip 8. Thus, the invention provides for securing each of the mounting members to the plate by simply engaging mounting mwember about the lip of a respective aperture and pressing it into a press-fit, clamping engagement with the lip. The mounting member is then sonically welded to the header plate as indicated at 18. This arrangement is particularly convenient since it allows a workman to secure and align all of the filter assemblies on the header plate so that all of the retaining collars can be welded to the plate in one operation. Moreover, since the mounting members augment the transverse rigidity of the header plate, the arrangement essentially eliminates the need for reinforcing ribs or the like in the header plate.

Figure 6:
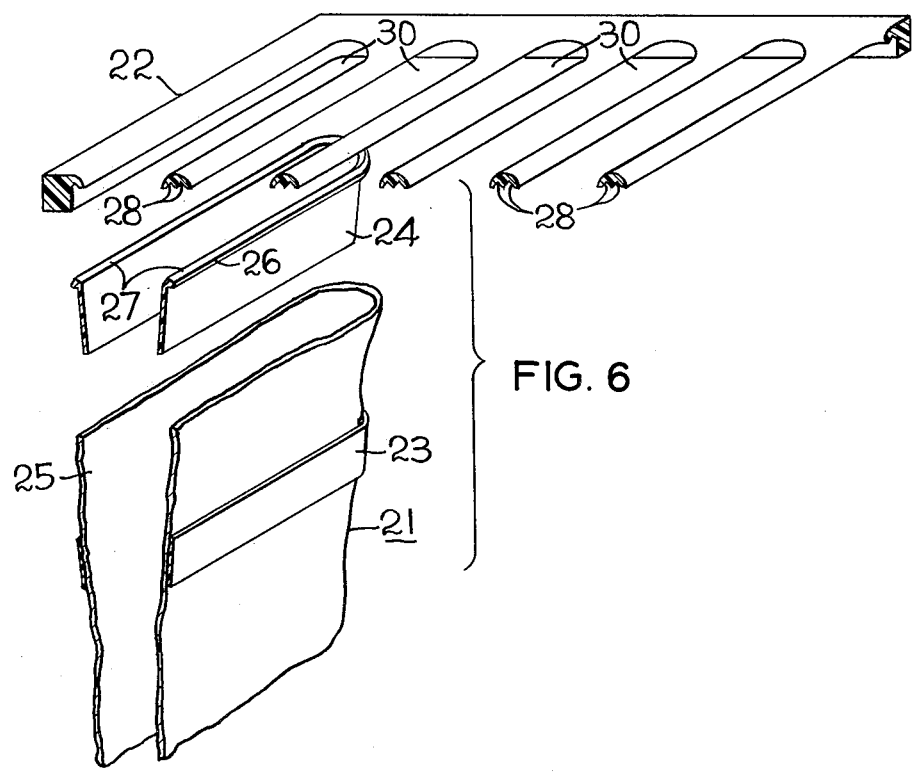
FIG. 6 is an exploded isometric view showing the alternative embodiment of FIG. 5.

FIGS. 5 and 6 show an alternative embodiment wherein a plurality of filter assemblies 21 are secured to a generally rectangular plastic header frame 22 solely by sonic welding. As in the first embodiment, a plastic retaining collar 23 is secured by sonic welding as indicated at 32 about a plastic mounting member 24 in a press-fit clamping fashion to affix the filter bag 25 to the mounting member. However, in this embodiment, the upper shoulder 26 of the mounting member 24 includes a bead or ridge 27 extending about the periphery of the mounting member. This bead or ridge 27 is engaged in an associated groove 28 in the lip 29 which encircles each of the apertures 30. Thus, when aligning one of the filter assemblies 21 with its respective aperture 30, a workman simply positions the filter assembly 21 so that the head 27 is engaged in the groove 28, whereafter the shoulder 26 is sonically welded to the frame 22 as indicated at 31. In this regard, it should be noted that while the beads 27 and the grooves 28 are shown to have V-shaped or tapered cross-sections, semi-circular or curved cross-sectional configuration would also be satisfactory.

From the foregoing, it can be seen that the invention contemplates a durable yet easily assembled filter cartridge in which all of the components except the filter bag can be formed by any one of many well known, yet inexpensive, plastic injection molding processes. High impact polystyrene plastic has been found to be particularly suited to this purpose. Moreover, the relatively lightweight construction of the cartridge makes it easy for a workman to handle during its assembly as well as being easy to install and remove in the field.

The embodiments of the invention in which an exclusive property or privilege is claimed are defined as follows:

1. A pocket filter cartridge for removing particulate solids from a dirty gas stream, comprising:
   a relatively flat, sheath-like filter bag open at one end;
   a header plate carrying the filter bag and being adapted to be secured across the dirty gas stream, said plate including an aperture opening into the open end of the filter bag and a projecting lip forming the marginal edge of the plate aperture;
   a flow-through mounting member disposed in the open end of the filter bag;
   a retaining collar cooperating with the mounting member sized to surround the filter and secure it between the mounting member in press-fit clamping relation;
   a shoulder on said mounting member surroundingly engaging said projecting lip to align the filter bag in flow-through communication with the plate aperture; and
   fastening means comprising a first serrate edge about the exterior periphery of said projecting lip and a second serrate edge about the interior periphery of said shoulder cooperating with said first serrate edge to secure the mounting member to the header plate.

2. The filter cartridge according to claim 1, and
a plurality of said filter bags being secured to said header plate in generally parallel side-by-side relation.

3. The filter cartridge according to claim 1, and
said filter bag extending downstream from the header plate so that the open end of the bag opens to the upstream side of the plate.

4. The filter cartridge according to claim 1, and
said mounting member being of a relatively tapered cross-sectional configuration, to enhance the transverse rigidity of the header plate.

5. The filter cartridge according to claim 1, and
said projecting lip having a groove about its periphery; and
said shoulder being contiguously engaged within said groove in dust-tight sealing engagement with the header plate.

6. The filter cartridge according to claim 1, and
said header plate, mounting member, and retaining collar being formed of an injection molded plastic material.

7. The filter cartridge according to claim 6, and
said retaining collar being affixed to said mounting member by a sonic weld.

8. The filter cartridge according to claim 6, and
said fastening means further comprising a sonic weld securing the mounting member to the header plate.

* * * * *